United States Patent
Taheri

(10) Patent No.: US 9,446,882 B2
(45) Date of Patent: Sep. 20, 2016

(54) DUAL CHAMBER CONTAINER STRUCTURE

(71) Applicant: Honeysuckle Products, LLC, Atlanta, GA (US)

(72) Inventor: Nossi Taheri, Atlanta, GA (US)

(73) Assignee: HONEYSUCKLE PRODUCTS, Marietta, GA (US)

( * ) Notice: Subject to any disclaimer, the term of this patent is extended or adjusted under 35 U.S.C. 154(b) by 44 days.

(21) Appl. No.: 14/284,090

(22) Filed: May 21, 2014

(65) Prior Publication Data

US 2015/0336712 A1    Nov. 26, 2015

(51) Int. Cl.
| | |
|---|---|
| *B65D 81/18* | (2006.01) |
| *B65D 25/10* | (2006.01) |
| *B65D 43/02* | (2006.01) |
| *A47J 36/24* | (2006.01) |

(52) U.S. Cl.
CPC ............... *B65D 25/10* (2013.01); *A47J 36/24* (2013.01); *A47J 36/2411* (2013.01); *B65D 43/02* (2013.01)

(58) Field of Classification Search
CPC ............... B65D 81/18; B65D 81/3216; A47J 36/2411; A47J 27/212; A47J 41/0044; A47J 19/2288

USPC ............... 220/23.91, 23.87, 592.01, 592.28, 220/573.4, 592.23
See application file for complete search history.

(56) References Cited

U.S. PATENT DOCUMENTS

| | | | | |
|---|---|---|---|---|
| 76,390 | A * | 4/1868 | Bevan ................ | F25D 3/08 126/265 |
| 525,933 | A * | 9/1894 | Wood ................ | A47J 27/10 126/377.1 |
| 3,082,901 | A * | 3/1963 | Nakagawa ........... | A24F 19/025 131/242 |
| 3,288,344 | A * | 11/1966 | Woollen ............. | A47G 19/065 206/17 |
| 3,539,075 | A * | 11/1970 | Bautista ............. | A47G 19/12 220/23.87 |
| 4,163,471 | A * | 8/1979 | Leder ................ | A47J 36/2411 126/261 |
| 5,702,282 | A * | 12/1997 | Beckman ............ | A63H 3/52 446/219 |

* cited by examiner

*Primary Examiner* — Anthony Stashick
*Assistant Examiner* — Blaine Neway
(74) *Attorney, Agent, or Firm* — Stephen J. Terrell; Parks IP Law LLC

(57) ABSTRACT

A portable milk warmer that is suitable for use with vessels, such as ampules, bags or bottles, enclosing chilled or frozen liquids, such as breast milk. The portable milk warmer includes separate chambers in a single container that separates the vessel from a warming (or cooling) medium. The milk warmer includes a feature for filling an outer chamber with a warming or cooling medium.

20 Claims, 5 Drawing Sheets

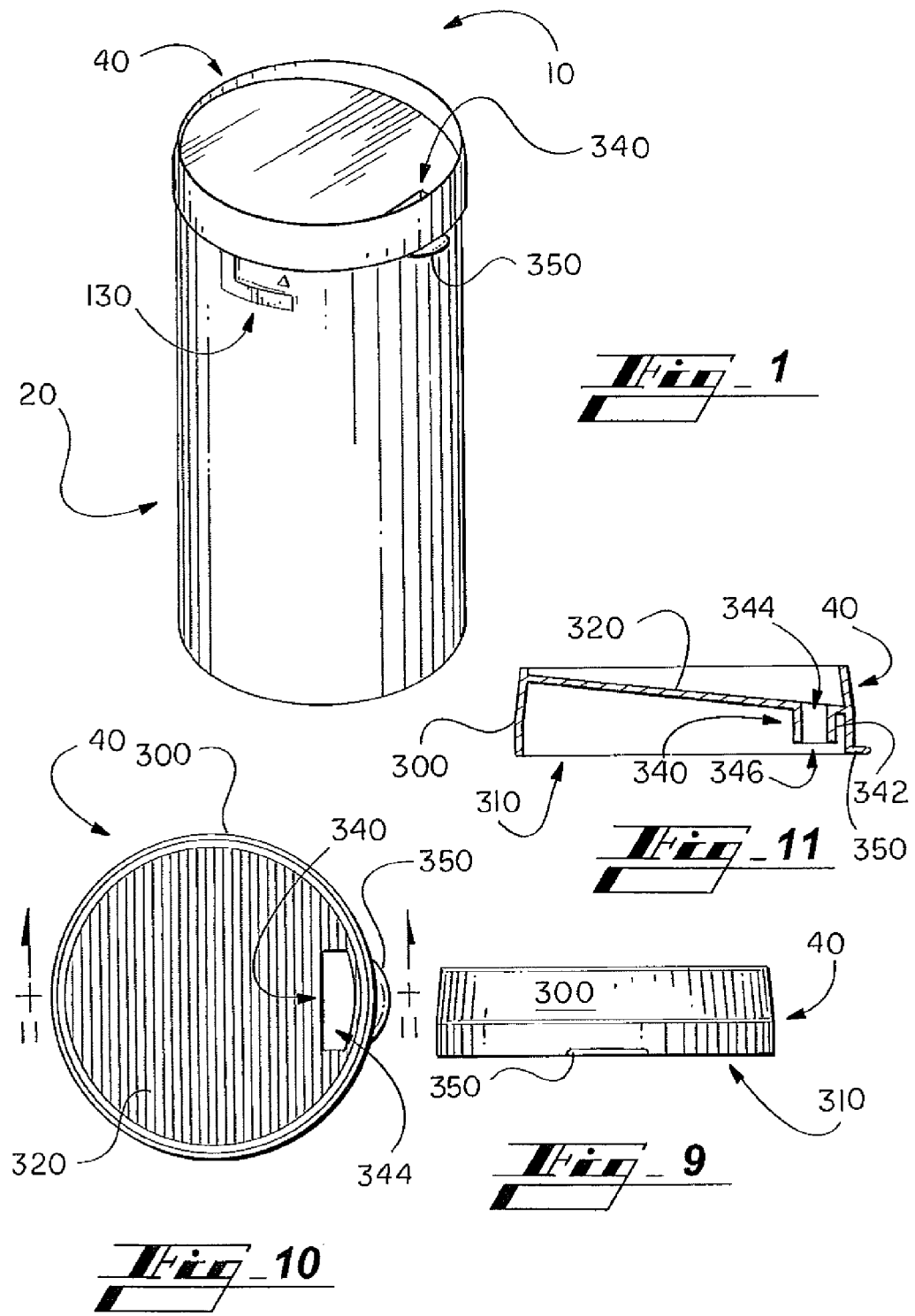

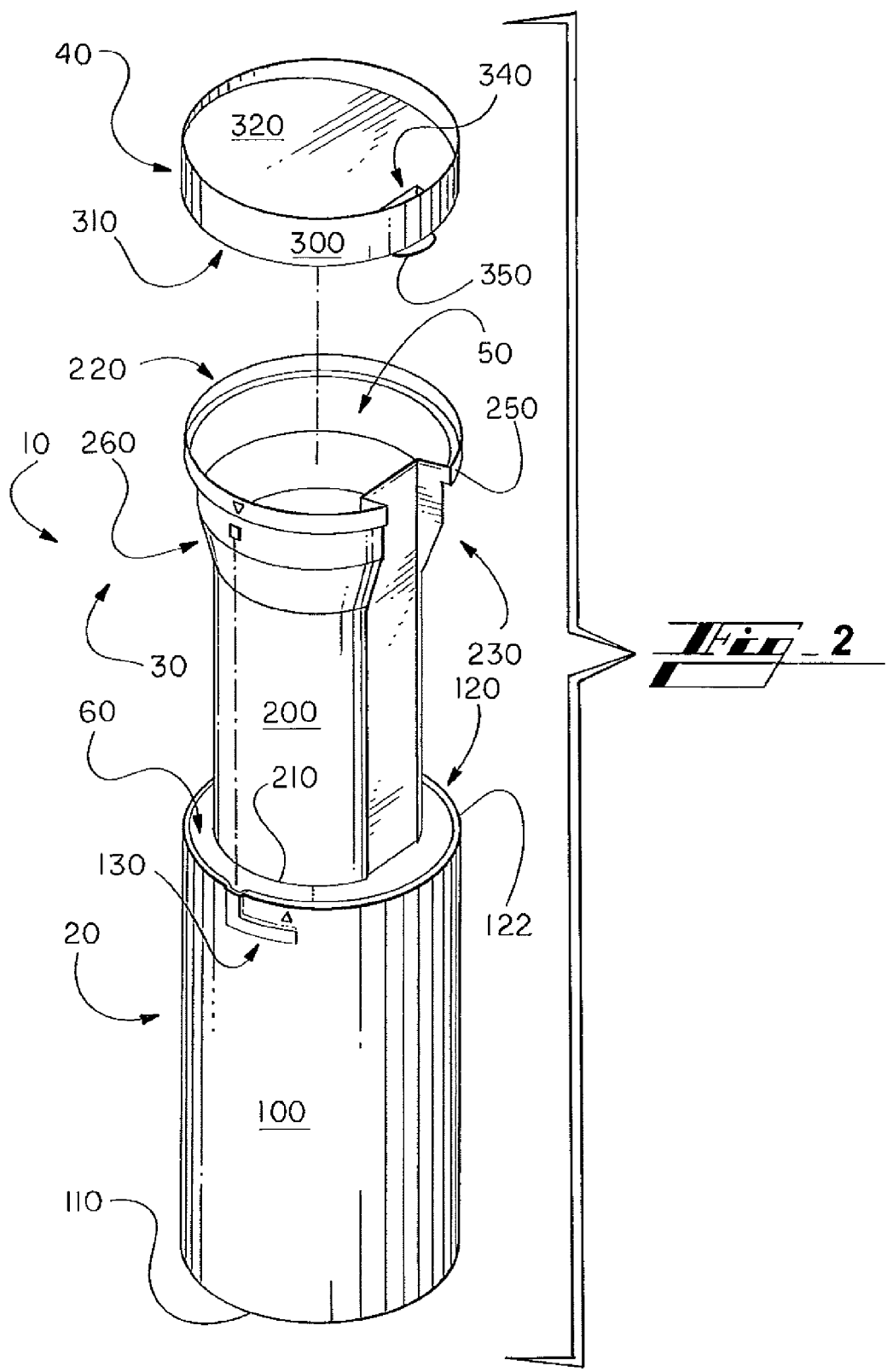
Fig_2

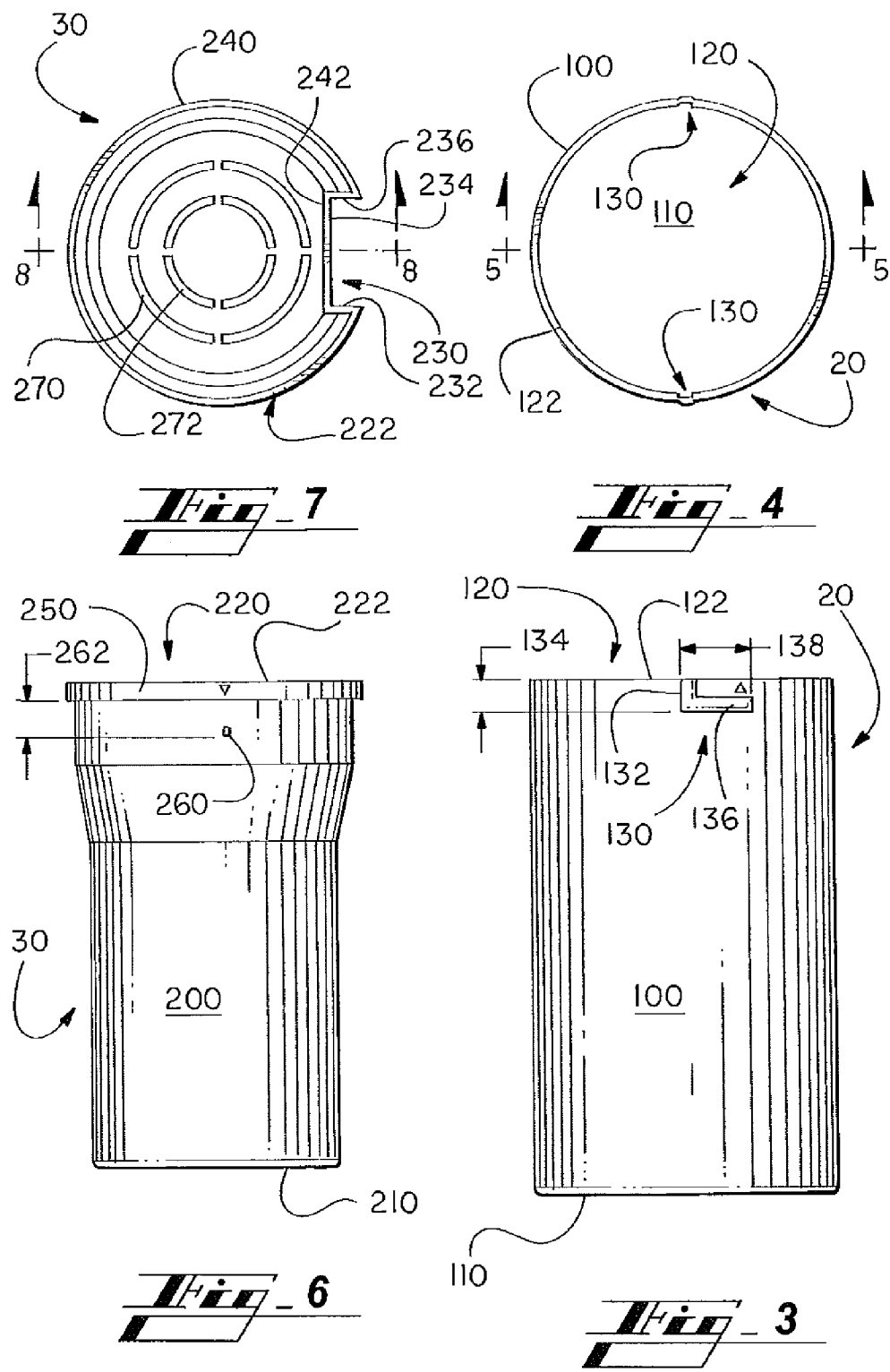

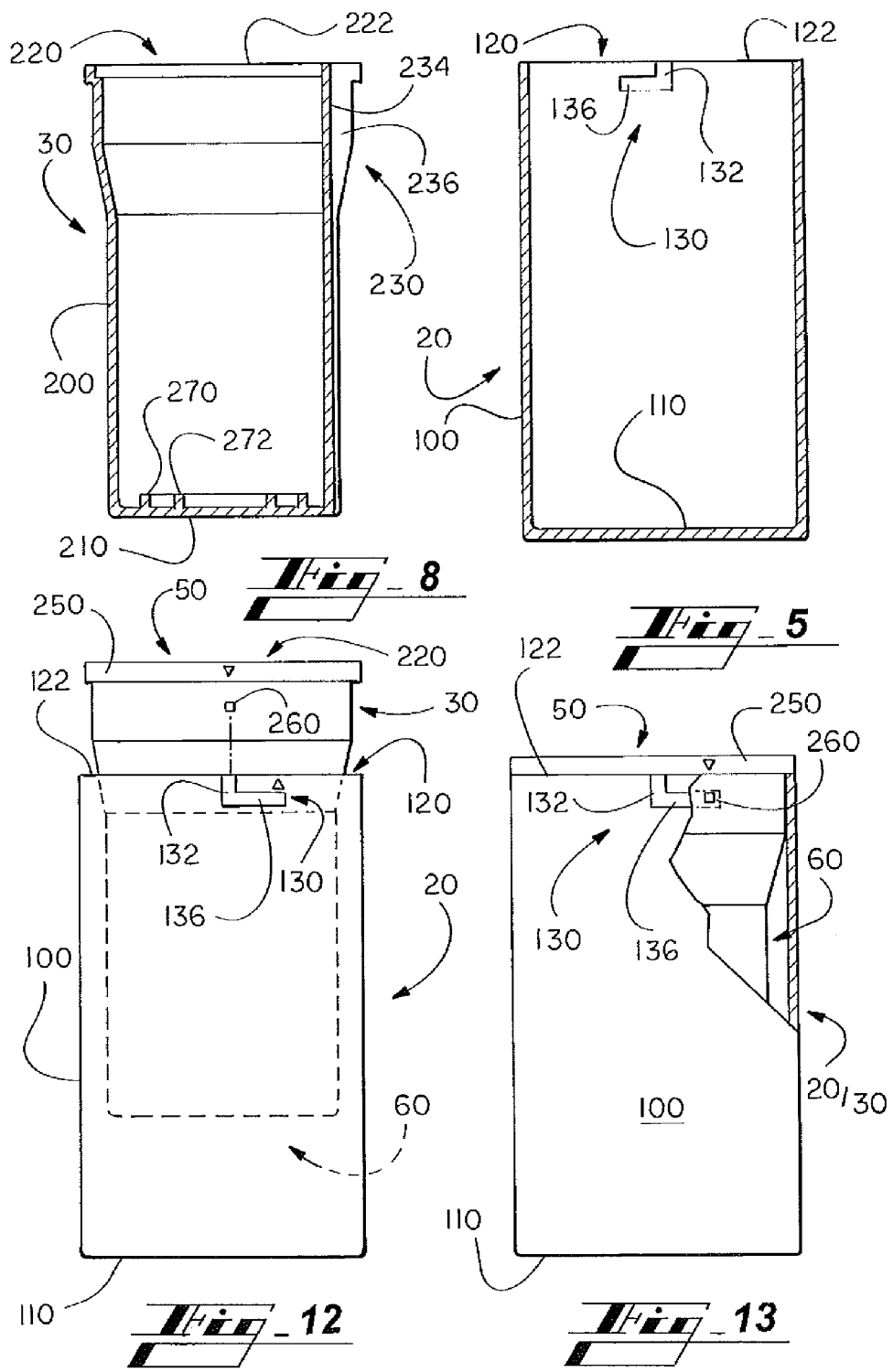

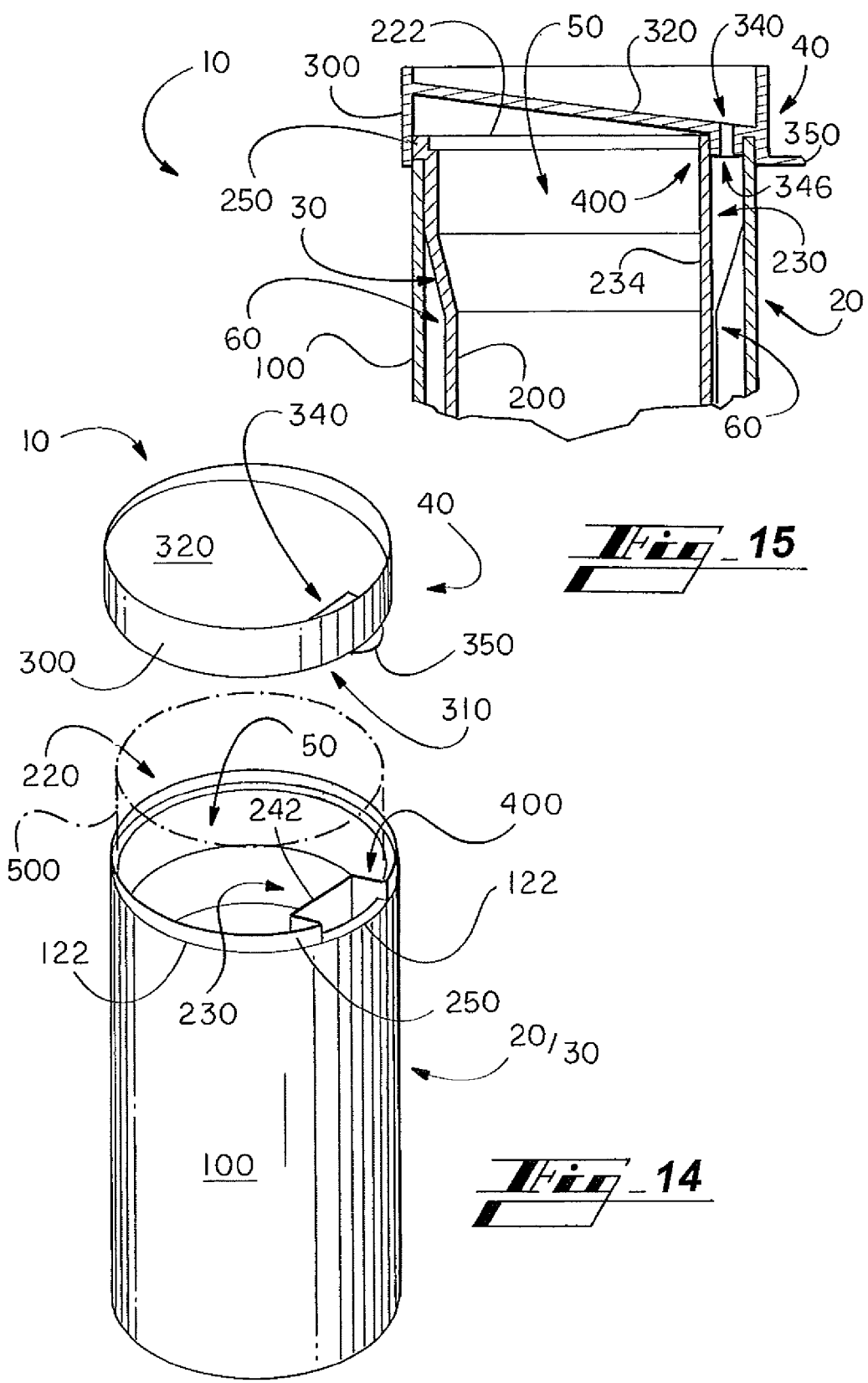

US 9,446,882 B2

DUAL CHAMBER CONTAINER STRUCTURE

TECHNICAL FIELD

The technical field relates generally to containers.

BACKGROUND

One problem with portable bottle warmers is that a user is required to carry multiple containers such as an insulated flask and a warming container. Also, some portable bottle warmers require electricity to operate and are not environmentally friendly.

Portable bottle warmers are used, for example, to warm a specimen, such as a frozen milk bag, formula prepared from a solvent, or viscous food item. However, with such portable warmers, a user is required to carry both a container for maintaining a warming medium, such as heated water, and a container for directly submerging the specimen in the warming medium.

Such bottle warmers use direct contact between water and the specimen to warm the specimen. This warming process is less sanitary and more timely because the user is required to directly contact the warming medium and the specimen in the submerging and/or removal process.

For instance, frozen milk bags are pre-sterilized. If they are placed in a hot bowl of water or other liquid medium, they are not as sterile as they were intended to be. Therefore, the sterility of the frozen milk bag is compromised.

For the use of frozen milk bags, such a warmer also exposes the specimen to excessively high temperatures. This exposure reduces the total nutrients in the specimen or otherwise affects the quality of a mother's milk.

In addition, many portable bottle warmers are not BPA free, Pthalate free, and dishwasher safe.

Therefore, a need exists in the industry to address the aforementioned deficiencies and inadequacies.

SUMMARY

The various embodiments of the present disclosure overcome the shortcomings of the prior art by providing a portable milk warmer that is suitable for use with vessels, such as ampules, bags or bottles, enclosing chilled or frozen liquids, such as breast milk. For purposes of this disclosure, the apparatus is described in the context of warming milk or formula for infants, although the principles are equally useful in other applications, such as warming other beverages, medicines, or other liquids.

The portable milk warmer includes separate chambers in a single container that separates the vessel from a warming medium. The portable milk warmer gradually warms the specimen to conserve nutrients or otherwise maintain the quality of a mother's milk.

The portable milk warmer can be used to thaw a frozen milk bottle or bag. The portable milk warmer can also be used to keep milk cold if so desired, for example, by using a medium of cold water rather than hot water.

The portable milk warmer is safe, BPA free, Pthalate free, and dishwasher safe.

According to an exemplary embodiment, a container structure includes an outer container including an outer top open end; an inner container including an inner top open end; and a lid including a lid top wall and a lid opening in the lid top wall. The inner container is configured to be received in the outer container and partially close the outer top open end such that an outer chamber is defined between the inner container and the outer container; and a channel opening to the outer chamber is defined between the inner container and the outer container. The lid is configured to cover the inner top open end such that an inner chamber is defined between the inner container and the lid; and the lid opening is aligned with the opening to the outer chamber.

The foregoing has broadly outlined some of the aspects and features of the various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a perspective view of a container structure.

FIG. 2 is an exploded perspective view of the container structure of FIG. 1.

FIG. 3 is a side elevational view of an outer container of the container structure of FIG. 1.

FIG. 4 is a plan view of the outer container of FIG. 3.

FIG. 5 is a side elevational cut-away view of the outer container of FIG. 3.

FIG. 6 is a side elevational view of an inner container of the container structure of FIG. 1.

FIG. 7 is a plan view of the inner container of FIG. 6.

FIG. 8 is a side elevational cut-away view of the inner container of FIG. 6.

FIG. 9 is a side elevational view of a lid of the container structure of FIG. 1.

FIG. 10 is a plan view of the lid of FIG. 9.

FIG. 11 is a side elevational cut-away view of the lid of FIG. 9.

FIG. 12 is a side elevational view of the outer container of FIG. 3 and the inner container of FIG. 6 illustrating a first step of an exemplary method of assembling the container structure of FIG. 1.

FIG. 13 is a side elevational partial cut-away view of the outer container of FIG. 3 and the inner container of FIG. 6 illustrating a second step of an exemplary method of assembling the container structure of FIG. 1.

FIG. 14 is a perspective view of the outer container of FIG. 3 and the inner container of FIG. 6 as combined in FIG. 13.

FIG. 15 is a partial side elevational cut-away view of the container structure of FIG. 1.

DETAILED DESCRIPTION

Detailed embodiments are disclosed herein. The disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. Well-known components, systems, materials, or methods that are known to those having ordinary skill in the art may not been described in detail in order to avoid obscuring the present disclosure. Specific structural and functional details disclosed herein are not to be interpreted as limiting, but merely as a basis for the claims and as a representative basis for teaching one skilled in the art.

Referring to FIGS. 1 and 2 a container structure 10 includes an outer container 20, an inner container 30, and a lid 40. As described in further detail below, the inner container 30 and the lid 40 define an inner chamber 50; an outer chamber 60 is defined between the inner container 30 and the outer container 20; the container structure 10 includes an outer chamber filling feature; and the container structure 10 includes a locking structure that is configured to releasably secure the inner container 30 inside the outer container 20.

Referring to FIGS. 3-5, the outer container 20 includes an outer cylindrical side wall 100, an outer bottom wall 110 at one end of the outer cylindrical side wall 100, and an outer top open end 120 at the opposite end of the outer cylindrical side wall 100. An outer top edge 122 of the outer cylindrical side wall 100 defines the shape of the outer top open end 120.

A mortise-type slot 130 is formed in the inside surface of the outer cylindrical side wall 100. The slot 130 includes a vertical portion 132 that extends vertically from the outer top edge 122 for a first distance 134 and a horizontal portion 136 that extends horizontally from a bottom end of the vertical portion 132 for a second distance 138.

The illustrated outer container 20 includes multiple slots 130. However, for purposes of clarity, only one slot is described in detail below. It should be understood by one having skill in the art that, in certain embodiments, a locking structure includes multiple of the described elements.

Referring to FIGS. 6-8, the inner container 30 includes an inner cylindrical side wall 200, an inner bottom wall 210 at one end of the inner cylindrical side wall 200, and an inner top open end 220 at the opposite end of the inner cylindrical side wall 200. The inner cylindrical side wall 200 tapers from the inner top open end 220 to the inner bottom wall 210. An inner top edge 222 of the inner cylindrical side wall 200 defines the shape of the inner top open end 220.

A channel 230 is formed in the inner cylindrical side wall 200. The illustrated channel 230 extends from a top end of the inner container 30 to a bottom end of the inner container 30. The channel 230 includes walls 232, 234, 236.

The shape of the inner top edge 222 is defined by the inner cylindrical side wall 200 and the channel 230 formed in the inner cylindrical side wall 200. For purposes of teaching, the portion of the inner top edge 222 defined by the inner cylindrical side wall 200 is designated as an inner cylindrical edge portion 240 and the portion of the inner top edge 222 defined by the channel 230 is designated as a channel portion 242.

A lip 250 protrudes outwardly from the inner cylindrical edge portion 240. The lip 250 is configured to abut the outer top edge 122 of the outer container 20 to partially close the outer chamber 60.

A tenon-type protrusion 260 is formed on the outside surface of the inner cylindrical side wall 200. The protrusion 260 is configured to be received in the slot 130 and is positioned at a third distance 262 from the lip 250.

The third distance 262 is substantially equal to the length of the first distance 134 such that the protrusion 260 is aligned with the horizontal portion 136 when the lip 250 abuts the outer top edge 122.

Concentric ribs 270, 272 extend upwardly into the interior of the inner container 30 from the inner surface of the inner bottom wall 210. The ribs 270, 272 keep a vessel dry by supporting the vessel away from the inner bottom wall 210 where frozen condensate may collect as the fluid in the vessel thaws. In contrast to prior art systems, the warmed vessel is not in direct contact with the warming liquid (which may include contaminants) and is elevated above the floor of the inner container 30 so that condensate will drain off of its outer surface without pooling along its bottom.

The concentric ribs 270, 272 are not full connected circles. Each rib 270, 272 includes disconnected segments (here, shown as four parts) so that the liquid does not collect in the area defined by a rib 270, 272 but is rather free to move between the segments to spread out over the inner bottom wall 210 evenly.

Referring to FIGS. 9-11, the lid 40 includes a lid cylindrical side wall 300, a lid bottom open end 310, and a lid top wall 320. The lid cylindrical side wall 300 is configured to be pressure fit over the lip 250 and the outer cylindrical side wall 100.

When the container structure 10 is assembled, the lid 40 closes the inner top open end 220 to define the inner chamber 50.

The lid 40 includes a chute 340 that extends from the lid top wall 320 toward the lid bottom open end 310. The chute 340 includes a chute cylindrical side wall 342, a chute top open end 344, and a chute bottom open end 346. The chute top open end 344 is an opening in the lid top wall 320. The chute 340 is positioned adjacent the lid cylindrical side wall 300 and the lid top wall 320 slopes downwardly toward the chute 340 such that a medium that is poured onto the top surface of the lid top wall 320 is funneled toward the chute top open end 344 and through the chute 340.

The lid 40 includes a wing 350 that protrudes outwardly from the lid cylindrical side wall 300. Here, the wing 350 is positioned along the lid cylindrical side wall 300 near the chute 340. The wing 350 is configured to facilitate upward force on the lid 40 to remove the lid 40 when it is pressure fit over the lip 250 and the outer cylindrical side wall 100.

Assembly of the container structure 10 is now described in further detail.

Referring to FIGS. 2, and 12-14, the outer container 20 and the inner container 30 are assembled.

Referring to FIGS. 2 and 12, the inner container 30 is positioned to be received in the outer container 20. Particularly, the inner container 30 and the outer container 20 are rotated with respect to one another such that the protrusion 260 is aligned with the vertical portion 132 of the slot 130.

The inner container 30 is inserted into the outer container 20 such that the protrusion 260 is received in the vertical portion 132 at a proximal end of slot 130. The protrusion 260 moves along the length of the vertical portion 132 until the lip 250 abuts the outer top edge 122. When the lip 250 abuts the outer top edge 122, the protrusion 260 is positioned at the bottom of the vertical portion 132 and aligned with the horizontal portion 136.

Referring to FIGS. 12 and 13, the inner container 30 and the outer container 20 are rotated with respect to one another such that the protrusion 260 moves along the length of the horizontal portion 136 to a distal end of the slot 130. When the protrusion 260 is positioned at the distal end of the slot 130, the inner container 30 is prevented from being vertically removed from the outer container 20 without first moving the protrusion 260 back to the vertical portion 132. As such, the inner container 30 is releasably secured in the outer container 20. The slot 130 and the protrusion 260 provide an exemplary locking structure.

Referring to FIGS. 13 and 14, when the inner container 30 is releasably secured to the outer container 20, the lip 250 abuts a first portion of the outer top edge 122 to partially close the outer chamber 60 (the volume that is between the inner container 30 and the outer container 20). Referring to FIG. 14, the channel portion 242 and a second portion of the outer top edge 122 define a channel opening 400, which is an opening to the outer chamber 60.

An item, illustrated in FIG. 14 as a milk bag 500, is inserted into the inner chamber 50 before attaching the lid 40.

Referring to FIGS. 14 and 15, the lid 40 is positioned to be received over the inner top open end 220. The lid 40 is rotated such that the chute 340 aligns with the channel opening 400.

Referring to FIGS. 1 and 15, the 40 lid is pressure fit over the lip 250 and the outer cylindrical side wall 100 and the chute 340 is received in the channel opening 400. Referring to FIG. 15, the chute bottom open end 346 extends below the channel portion 242 and the outer top edge 122 such that a medium that is poured through the chute 340 is directed into the outer chamber 60 through the channel opening 400.

As used herein, the term "cylindrical" is not limited to any particular cross-section. For example, a cylinder can have a circular or square cross section. In addition, the term "cylindrical" is not limited to a constant cross-section but rather may be tapered or otherwise vary along a longitudinal axis.

The terms top, bottom, side, and the like are not limiting with respect to orientation but rather are used to distinguish one element from another.

The above-described embodiments are merely exemplary illustrations of implementations that are set forth for a clear understanding of principles. Variations, modifications, and combinations may be made to the above-described embodiments may be made without departing from the scope of the claims. All such variations, modifications, and combinations are included herein by the scope of this disclosure and the following claims.

What is claimed is:

1. A container structure, comprising:
   an outer container comprising an outer top open end;
   an inner container comprising an inner top open end; and
   a lid comprising a lid top wall and a lid opening in the lid top wall;
   wherein the inner container is configured to be received in the outer container and partially close the outer top open end such that:
      an outer chamber is defined between the inner container and the outer container; and
      an outer chamber opening to the outer chamber is defined between the inner container and the outer container;
   wherein the lid is configured to cover the inner top open end such that:
      an inner chamber is defined between the inner container and the lid; and
      the lid opening is aligned with the outer chamber opening;
   wherein the inner container comprises an inner top edge at the inner top open end and the outer container comprises an outer top edge at the outer top open end;
   wherein a first portion the inner top edge is configured to abut a second portion of the outer top edge to partially close the outer top open end; and
   wherein a third portion of the inner top edge and a fourth portion of the outer top edge define an edge of the outer chamber opening.

2. The container structure of claim 1, wherein the inner container is tapered.

3. The container structure of claim 1, wherein the first portion of the inner top edge comprises a lip.

4. The container structure of claim 1, wherein the outer chamber opening is at a top of a channel formed in the inner container.

5. The container structure of claim 1, the lid comprising a chute, the chute comprising a chute top open end at the lid opening and a chute bottom open end at the outer chamber opening, wherein the chute bottom open end extends from the chute top open end toward the outer chamber opening.

6. The container structure of claim 5, wherein the chute bottom open end extends through the outer chamber opening.

7. The container structure of claim 1, the inner container comprising a bottom wall and a rib on an inside surface of the bottom wall.

8. The container structure of claim 1, the lid comprising a lid side wall, wherein the lid opening is formed in the lid top wall adjacent the lid side wall.

9. The container structure of claim 8, wherein the lid top wall is slanted downwardly toward the lid opening.

10. The container structure of claim 9, comprising a locking structure configured to releasably secure the inner container and the outer container to one another, the locking structure comprising a slot formed in an inside surface of the outer container and a protrusion formed on an outside surface of the inner container, the slot comprising a vertical portion and a horizontal portion.

11. The container structure of claim 1, the inner container comprising an inner cylindrical side wall with an inner bottom wall at one end and the inner top open end at the other end; and the outer container comprising an outer cylindrical side wall having an outer bottom wall at one end and the outer top open end at an opposite end.

12. A container structure, comprising:
   an outer container comprising an outer cylindrical side wall with an outer bottom wall at one end and an outer top open end at the other end, an outer top edge around the outer top open end;
   an inner container comprising an inner cylindrical side wall with an inner bottom wall at one end and an inner top open end at the other end, an inner top edge around the inner top open end, a portion of the inner top edge comprising a lip; and
   a lid comprising a lid side wall, a lid top wall, and a lid opening in the lid top wall;
   wherein the inner container is received in the outer container such that the lip abuts the outer top edge to partially close the outer top open end;
   wherein an outer chamber is defined between the inner container and the outer container; and
   wherein an outer chamber opening to the outer chamber is defined between a portion of the inner top edge and a portion of the outer top edge;
   wherein the lid covers the inner top open end such that an inner chamber is defined between the inner container and the lid; and
   wherein the lid opening is aligned with the outer chamber opening;
   wherein the inner container comprises an inner top edge at the inner top open end and the outer container comprises an outer top edge at the outer top open end;
   wherein a first portion the inner top edge is configured to abut a second portion of the outer top edge partially close the outer top open end; and
   wherein a third portion of the inner top edge and a fourth portion of the outer top edge define an edge of the outer chamber opening.

13. The container structure of claim 12, the inner container comprising a channel, wherein the outer chamber opening is an opening at a top of the channel.

14. The container structure of claim 12, wherein the inner container is tapered.

15. The container structure of claim 12, the lid comprising a chute, the chute comprising a chute top open end at the lid opening and a chute bottom open end, wherein the chute bottom open end extends from the top open end toward the outer chamber opening.

16. The container structure of claim 8, wherein the lid side wall further defines the outer chamber.

17. The container structure of claim 8, wherein the lid top wall further defines the outer chamber.

18. The container structure of claim 8, wherein the each of the third portion, the second portion, and the fourth portion is adjacent the lid side wall.

19. The container structure of claim 18, wherein the third portion is at least partially offset from the lid side wall.

20. The container structure of claim 8, wherein the lid side wall is configured to fit over an outer side wall of the outer container.

\* \* \* \* \*